United States Patent [19]

Berman et al.

[11] Patent Number: 5,766,455
[45] Date of Patent: Jun. 16, 1998

[54] FIBROUS MATTE SUPPORT FOR THE PHOTOPROMOTED CATALYZED DEGRADATION OF COMPOUNDS IN A FLUID STREAM

[75] Inventors: Elliot Berman, Quincy; Anatoly Grayfer, Newton, both of Mass.

[73] Assignee: Zentox Corporation, Ocala, Fla.

[21] Appl. No.: 643,149

[22] Filed: Apr. 30, 1996

[51] Int. Cl.$^6$ .................................................. C02F 1/32
[52] U.S. Cl. ............... 210/199; 204/157.3; 204/157.15; 210/203; 210/205; 210/493.1; 422/121; 422/171; 422/177; 422/186.3
[58] Field of Search ............... 204/157.3, 157.15, 204/157.6, 158.2; 210/748, 763, 199, 203, 205, 493.1; 422/186.3, 222

[56] References Cited

U.S. PATENT DOCUMENTS

| | | | |
|---|---|---|---|
| 3,360,120 | 12/1967 | Getzin | 210/493.3 |
| 4,264,421 | 4/1981 | Bard et al. | 204/157.1 R |
| 4,303,486 | 12/1981 | Bard et al. | 204/162 R |
| 4,678,578 | 7/1987 | Nodes et al. | 210/493.1 |
| 4,788,038 | 11/1988 | Matsunaga | 422/22 |
| 4,861,484 | 8/1989 | Lichtin et al. | 210/638 |
| 4,888,101 | 12/1989 | Cooper | 204/157.15 |
| 4,892,712 | 1/1990 | Robertson et al. | 422/186 |
| 4,966,759 | 10/1990 | Robertson et al. | 422/186 |
| 4,980,040 | 12/1990 | Lichtin et al. | 204/157.46 |
| 5,032,241 | 7/1991 | Robertson et al. | 204/157.15 |
| 5,035,784 | 7/1991 | Anderson | 422/186.3 |
| 5,045,288 | 9/1991 | Raupp et al. | 204/157.3 |
| 5,078,971 | 1/1992 | Matuda et al. | 422/121 |
| 5,232,595 | 8/1993 | Meyer | 210/493.1 |
| 5,449,443 | 9/1995 | Jacoby et al. | 204/157.3 |
| 5,564,065 | 10/1996 | Fleck et al. | 422/186.3 |

OTHER PUBLICATIONS

Matsubara, H. et al., "Photoactive TiO$_2$ Containing Paper: Preparation and Its photocatalytic Activity under Weak UV Light Illumination", *Chemistry Letters*, 1995, 767–768.

Matthews, Ralph W., "Photooxidation of Organic Impurities in Water Using Thin Films of Titanium Dioxide", *J. Phys. Chem.*, 1987, 91, 3328–3333.

Wilson, Elizabeth, "Titanium dioxide catalysts break down pollutants", *C&EN*, Jan. 15, 1996, pp. 23–24.

*Primary Examiner*—Peter A. Hruskoci
*Attorney, Agent, or Firm*—Darby & Darby PC

[57] ABSTRACT

A fibrous matte web is used to support a semiconductor catalyst for use in the photopromoted catalyzed degradation of compounds in a fluid stream. The catalyst, which may be a transition metal oxide, is affixed to at least one side of the matte web, and preferably the downstream side thereof. In one embodiment, the matte web is comprised of a plurality of fibers of glass or other suitable material permitting fluid to pass therethrough, and the side or sides containing the catalyst are directly illuminated by a suitable light source.

20 Claims, 1 Drawing Sheet

FIBROUS MATTE SUPPORT FOR THE PHOTOPROMOTED CATALYZED DEGRADATION OF COMPOUNDS IN A FLUID STREAM

BACKGROUND OF THE INVENTION

The present invention relates to a structure and method for the photopromoted catalytic degradation of contaminants in a fluid stream and, more particularly, to a fibrous matte support for a semiconductor catalyst in such a process.

Chemical and biological agents from a variety of sources present hazards to health and the environment, particularly when they enter the air we breathe and the water we drink. For this reason, there has long been a need for efficient, cost effective methods for removing contaminants from fluid streams. In addition to the obvious problems of water and soil remediation, indoor air pollution has recently been identified as a health risk. In each of these areas, the need for efficient solutions has become increasingly acute with the advent of more stringent regulatory standards.

Considerable effort has been expended in recent years toward the development of methods and techniques for removing destructive compounds and biological agents from fluid streams. A particularly promising approach is the photopromoted catalyzed degradation of such compounds and agents, which involves the oxidation and/or reduction and destruction of organic materials including bacteria, viruses and pesticides, inorganic materials including carbon monoxide, ammonia and hydrogen sulfide, and the removal of odors including, e.g. garlic odor and onion odor. Such procedures are disclosed in Lichtin et al., U.S. Pat. Nos. 4,861,484 and 4,980,040, Matsunaga U.S. Pat. No. 4,788,038, Raupp et al., U.S. Pat. No. 5,045,288, and Bard et al., U.S. Pat. Nos. 4,264,421 and 4,303,486. Specific devices for these purposes are disclosed in Matthews et al., *J. Phys. Chem.* 1987, 91, 3328-3333; Robertson et al., U.S. Pat. Nos. 4,892,712, 4,966,759 and 5,032,241; and Anderson et al., U.S. Pat. No. 5,035,784. The disclosures of these documents are hereby incorporated by reference for all purposes.

Photopromoted catalytic degradation involves exposing a contaminated fluid stream to a catalyst in the presence of air or oxygen and a light source which activates the catalyst. The catalyst used is often an oxide of a transition metal, such as $TiO_2$, but can also be any of a variety of other known semiconductor catalysts.

In most prior applications, a catalyst is either kept in a fluidized bed or coated onto the surface of a support for contact with a contaminated fluid stream. One common support surface is the smooth interior wall of a reaction vessel, which is typically made of glass. A more sophisticated arrangement is disclosed in Jacoby et al., U.S. Pat. No. 5,449,443, in which a catalyst is affixed to flexible strips exposed to a contaminated fluid stream. A blower unit moves the fluid through the flexible strips, and thus into contact with the catalyst. An ultraviolet light source irradiates the strips to activate the catalyst and oxidize contaminants in the fluid stream. Another approach, disclosed in U.S. Pat. No. 4,888,101 to Cooper, is to "entrap" the semiconductor, either within a layer of glass wool confined between two transparent plates or within pores on the surface of a solid support material. However, each of these prior structures has limitations which can hinder its usefulness in a real world setting.

As described in the Bard '421 patent, in many circumstances the presence of a suitable metal on the semiconductor catalyst increases the efficiency of the degradation process. Noble metals, such as platinum and/or palladium, are often used for this purpose; however, existing methods for distributing and affixing the metal tend to be wasteful of these costly materials.

Accordingly, there is a pronounced need for more efficient reaction support surfaces and processes for the photopromoted catalytic degradation of compounds in a fluid stream.

SUMMARY OF THE INVENTION

The structure and method of the invention utilize a fibrous matte web which not only supports a catalyst for the degradation of chemical and biological contaminants in a fluid stream, but also acts as a mechanical filter to remove relatively large, nonreactive particles which otherwise would build up on the catalyst and render it less effective. In one embodiment, the catalyst is located only on the downstream side of the web, protecting it from contact by large particles in the fluid stream. The catalyst is preferably illuminated at that location to enhance the chemical reaction.

Because the matte web is a sheet of densely packed fibers, it is capable of supporting a catalyst while at the same time permitting a fluid stream to pass substantially transversely through it. This facilitates both filtration and chemical reaction. A large filtration area enables the device to operate for a relatively long time without clogging, whereas a large reaction area increases the rate at which contaminants are degraded. The capacity of the device to degrade contaminants is further enhanced when a plurality of matte webs constructed according to the invention are placed in series for successive treatment of a single fluid stream. With large, nonreactive particles filtered out first, the catalyst remains operational for a very long time. In addition, the sheet-like character of the web enables it to be pleated or otherwise configured to increase filtration and reaction areas.

Accordingly, the structure and method of the present invention involves a reactor for the photopromoted catalyzed degradation of compounds in a fluid stream, including: a conduit for directing a fluid stream, the conduit defining a reaction chamber; a fibrous matte web within the reaction chamber and having first and second sides, the matte web comprising a plurality of fibers permitting the fluid stream to pass from the first side to the second side; a semiconductor catalyst affixed to at least one side of the matte web for contact by the fluid stream; and a light source disposed to illuminate at least a portion of the catalyst in contact with the fluid stream. In one embodiment, the matte web is a self-supporting sheet of fibrous material, which may be pleated, and is typically made up of either glass fibers or cellulose fibers. When the fluid stream passes through the matte web from the first side to the second side, the semiconductor catalyst may be disposed on the second side and be illuminated there by the light source. The semiconductor catalyst may be an oxide of a transition metal, such as titanium dioxide, or any of a number of other suitable oxides.

The apparatus and method of the present invention take full advantage of the kinetics of photopromoted catalytic processes to increase the efficiency of degradation beyond that achieved previously.

BRIEF DESCRIPTION OF THE DRAWINGS

The above and other features of the present invention may be more fully understood from the following detailed description, taken together with the accompanying drawings, wherein similar reference characters refer to similar elements throughout and in which.

DETAILED DESCRIPTION OF THE DRAWINGS

Figure 1:
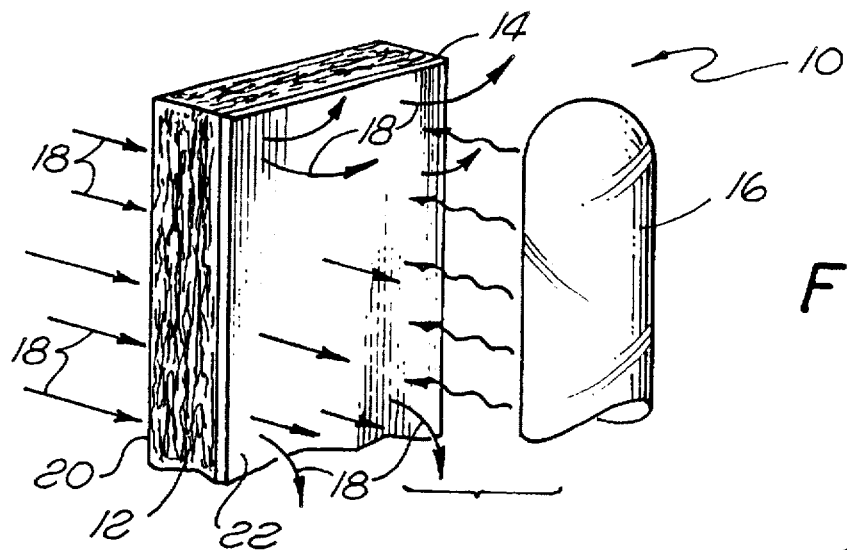
FIG. 1 is a diagrammatic view of a fibrous matte web constructed according to the teachings of the present invention under illumination, the thicknesses of the matte web and its catalytic coating being exaggerated for purposes of illustration.

Referring now to the drawings, FIG. 1 is a diagrammatic representation of a reaction environment 10 constructed according to one embodiment of the present invention. The reaction environment 10 contains a fibrous matte web 12 supporting a semiconductor catalytic coating 14 irradiated by a light source 16. A contaminated fluid stream 18, which may be either gaseous or liquid, passes through the matte web 12 for reaction with the catalytic coating under exposure to light from the source 16. The reaction mechanism is photopromoted catalytic oxidation, which degrades chemical contaminants and destroys biological agents. In one embodiment, the catalytic coating 14 is at least partially "metalized", i.e., coated with a suitable metal, to improve the efficiency of the chemical reaction.

The matte web 12 is a sheet-like body made up of a large number of densely-packed fibers forming a porous web which permits fluids to pass from one of its major surfaces, or "sides", to another. The web may be formed by a process similar to that used in the paper-making industry, as described in more detail below, using fibers of any suitable material. A binder will also typically be used to hold the fibers together without inhibiting the flow of fluids through the web.

The fibers of the matte web 12 may be made up of glass, cellulose or a suitable synthetic polymer, such as polyester, with glass being preferred in some circumstances. One particularly advantageous material is the glass fiber mat currently used as a filter media in certain air filters, including those known as High Efficiency Particulate Air ("HEPA") filters. Material of this type is available commercially from Lydall, Inc. in a number of densities and dimensions, one of which is sold under the designation Class 3000 for HEPA filter applications. Other suitable densities include Class 1000 "ASHRAE" grade, Class 2000 "Prefilter/Hospital" grade and Class 5000 "ULPA" grade.

In one advantageous embodiment, the matte web 12 is a substantially self-supporting sheet through which air or other fluids can be passed in a lateral direction from a first major surface 20 to a second major surface 22. The semiconductor catalyst 14 is then distributed over the length and width of the matte web, sometimes selectively in the form of the coating illustrated in FIG. 1. In other cases, however, the catalyst is located on both major surfaces of the web, or distributed throughout its thickness. In each case, however, at least some of the catalyst must be disposed to receive light from the light source 16.

The semiconductor catalyst is preferably metalized, as stated above, to enhance process efficiency and prevent deterioration of the catalyst. The metal used may be a noble metal, such as platinum and/or palladium, and may be deposited on the catalyst 14 before the catalyst is applied to the matte web 12, as described in U.S. Pat. No. 4,264,421 to Bard et al. Alternatively, the metal may be affixed to the catalyst in situ, after the catalyst is applied to the matte web, as described in a co-pending United States Patent Application of Elliot Berman and Anatoly Grayfer entitled "In Situ Method for Metalizing a Semiconductor Catalyst", the disclosure of which is hereby incorporated by reference for all purposes. This latter method is accomplished by irradiating the catalyst in the presence of a source of metal so that light hits the catalyst in the same pattern and at the same intensity as it will when the web is used in the degradation process.

More specifically, one method of preparing the matte web 12 is to formulate a slurry containing the catalyst and the source of metal ions in an aqueous solution. Where the catalyst is titanium dioxide, a useful form of titanium dioxide is Degussa P-25 sold by the Degussa Corporation. The slurry may then be composed, for example, of between five and nine parts de-ionized water and one part Degussa P-25, with 0.05 percent of the metal ion source, based on weight of the titanium dioxide. When the metal ion is platinum, the platinum ion source may be any suitable platinum-containing compound, such as 0.01M hexachloroplatinic acid in 0.1M hydrochloric acid, neutralized with sodium carbonate and brought to a pH of about 4 by the addition of acetic acid. The slurry is then coated onto the second major surface 22 of the matte web 12. Alternatively, the mixture may be coated onto both surfaces (20 and 22) of the web, or distributed through the thickness of the web. In the latter case, the slurry can be incorporated into the matte web during formation, either in an aqueous bath used to form the web (for "water laid" webs) or on the fibers themselves by for example, spraying (for "air laid" webs). After the web containing the semiconductor catalyst is prepared, it is inserted into the reaction chamber and illuminated in exactly the way it will be illuminated when used to degrade contaminants.

In an alternate form of the method, the slurry is prepared by mixing de-ionized water with the same catalyst without a source of metal ions. The slurry is then coated or otherwise introduced into the matte web 12, after which a source of metal ions is separately introduced to the web. The source of metal ions may be the same as described above, but sprayed directly onto the matte web.

Figure 2:
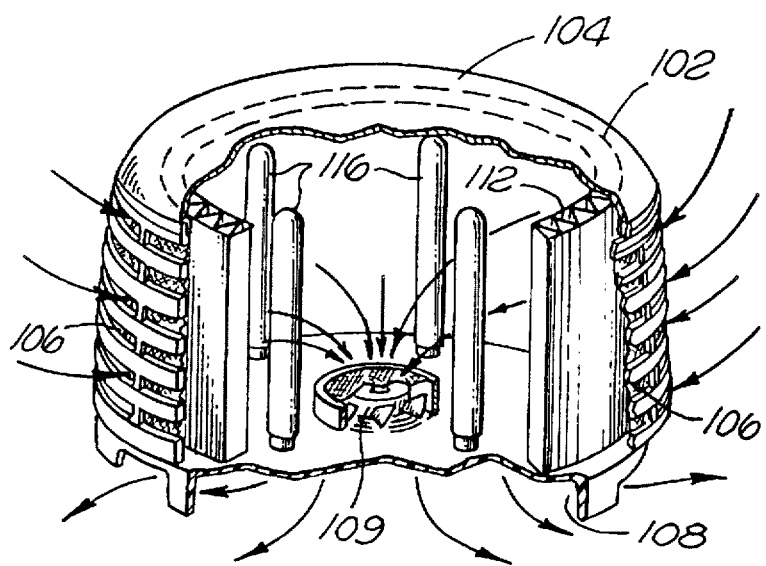
FIG. 2 is an isometric view, partially broken away, of a room air cleaner constructed according to a specific embodiment of the invention.

Referring now to FIG. 2, an air cleaning apparatus 100 is one specific form of the reaction environment 10 of FIG. 1. The air cleaning apparatus 100 has a cylindrical reaction support structure 102 surrounding four spaced-apart light sources 116 parallel to its axis. The reaction support structure 102 is itself contained within a generally cylindrical housing 104, which defines a reaction chamber having inlets 106 through its side walls and an outlet 108 at its lower end. A fan 109 within the housing 104 draws air into the reaction chamber through the inlets 106 and the reaction support structure 102, and expels the air through the outlet 108. The reaction support structure 102 is fabricated from a matte web 110 similar to the matte web 10 of FIG. 1, but is pleated over its circumference to increase the surface area over which the degradation reaction takes place. The upper and lower ends of the reaction support structure 102 preferably form an effective seal against the interior housing 104 so that the fan 109 draws essentially all of its air inwardly through the reaction support structure 102 and expels substantially all of the air through the outlet 108. Of course, each of the variations of the matte web and the disposition of catalyst and metal described above with respect to the web 10, apply to the web 110, as well.

Although the semiconductor catalyst (not specifically shown) can be distributed throughout the web, if desired, it is advantageous in many situations to coat only the interior surface of the matte web 110 because it is only at that location that the catalyst receives light from the light sources 116.

The air cleaning apparatus 100 operates particularly well as a room air cleaner because any relatively large contaminants are filtered out by the matte web at its outer surface, and thereby separated from the activated portion of the semiconductor catalyst. Thus, the illuminated portion of the catalyst is not masked by such impurities, leaving it free to react with the gaseous or very small particulate contaminants that could not otherwise be removed from the air stream. Thus, the matte web 110 acts advantageously to mechanically filter large contaminants and chemically degrade hazardous Volatile Organic Compounds (VOC's) and other gaseous impurities. When glass fiber matte of the type used in HEPA filters is used, particles as small as approximately 0.3 microns in diameter are effectively removed by filtration.

Figure 3:
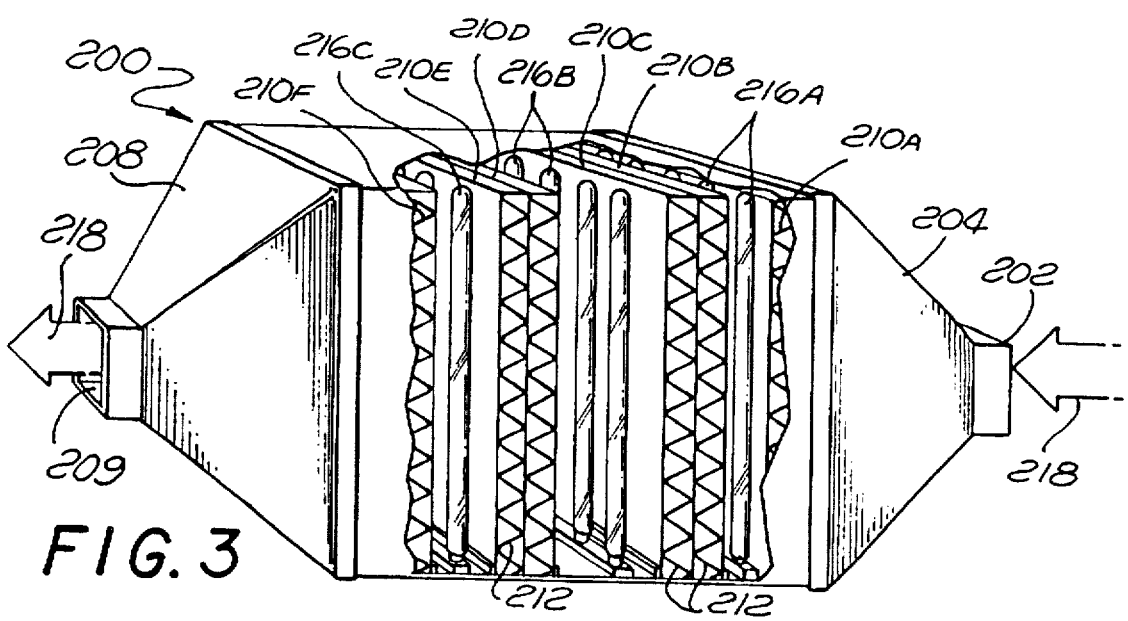
FIG. 3 is an isometric view, partially broken away, showing a fluid reactor, such as a ground water remediation reactor, constructed according to another embodiment of the invention. This reactor is useful, for example, in practicing one superior method of removing and destroying volatile organic compounds (VOC's) contained in ground water. According to this method, a ground water stream is passed counter to an air stream (so-called "air stripping") so that the VOC's enter the air stream. The air stream is then passed to a device like that illustrated in FIG. 3 for degradation of the VOC's.

Turning now to FIG. 3, an apparatus 200 is designed to remove contaminants from either gaseous or liquid streams containing concentrations of contaminants large enough that more than one "pass" through a catalyst support structure is required. The apparatus 200 has a fluid inlet 202 leading to a transition element 204 and ultimately to a principal reaction chamber 206, after which the stream is funneled down again by a transition element 208 to exit through a fluid outlet 209. Within the principal reaction chamber 206 are a plurality of reaction support structures, 210A, 210B, 210C, 210D, 210E and 210F. Each is pleated in the manner of the support structure 102 of FIG. 2, but arranged to form a substantially flat structure through which fluid passes in a transverse direction. These flat support structures are individually replaceable and are made up of a matte web material 212 which is the same as the webs 12 and 112 of FIGS. 1 and 2, respectively. When the apparatus 200 is used to clean a gaseous stream produced in the course of groundwater remediation, the reaction support structures 210A–210F may be pleated filters approximately two feet square and between one and two inches thick. Such filters in the illustrated arrangement are suitable for degrading a relatively large proportion of the contaminants in stream at flow rates of between 50 and 500 cubic feet per minute. One advantage of pleating is that it provides a large reactive area with small pressure drop in a small volume. For example, a two foot by two foot pleated filter having 7.7 pleats to the inch and a pleat depth of 35 mm will have an area of 84.88 square feet per side, or approximately 22 times the area of an unpleated filter.

A plurality of coplanar light sources 216A are disposed between and parallel to the reaction support structures 210A and 210B, a similar series of coplanar light sources 216B are disposed between the reaction support structures 210C and 210D, and yet another series of light sources 216C are disposed between the reaction support structures 210E and 210F. The upper pleated surfaces of reaction support structures 210A, 210C and 210E, and the lower pleated surfaces of the reaction support structures 210B, 210D and 210F, are coated with semiconductor catalyst (not specifically shown) similar to the semiconductor catalytic coating 14 of FIG. 1, and are preferably metalized in the manner described above in connection with the embodiments of FIGS. 1 and 2.

A fluid stream 218 entering the fluid inlet 208 is filtered by the matte web 212 of the reaction support structure 210A, mechanically removing the relatively large contaminants from the fluid stream. Contaminants too small for removal by the matte web 212 pass through the reaction support structures and contact the catalytic coatings thereon. Because the surfaces containing the metalized catalyst are illuminated by the light sources 216A, 216B and 216C, chemical and biological contaminants are effectively degraded within the principal reaction chamber 206. By the time the fluid exits the upper reaction support structure 210D, the level of contaminants is significantly reduced. If the various elements of the apparatus 200 are designed properly, the fluid leaving through the fluid outlet 209 has an average contaminant concentration well within acceptable environmental and health limits.

In each of the illustrated embodiments, the parameters of the light sources, the matte webs, the catalytic coatings and the metalized coatings are calculated to cause the semiconductor catalyst to be illuminated within a preselected range of optimal values appropriate for the chemical processes being performed. Contaminants are degraded through an oxidation process which requires the presence of oxygen or other suitable oxidizing agent. The oxygen content of air is usually sufficient for the reaction to proceed efficiently; however, oxygen may be added if desired.

For a light source of a given intensity, the amount of light reaching a particular portion of the semiconductor catalyst on the matte webs 12, 112 and 212, depends on both the inclination angle of the surface of the matte web relative to the incoming light and the distance of the matte web from the light source. The optical characteristics of the reaction chamber, and thus the efficiency of the photopromoted catalytic reaction, are controlled by selecting appropriate dimensions and shapes for the components involved. As a general rule, an increase in catalyst surface area lowers the average light intensity on the catalyst itself. In the embodiments of FIGS. 2 and 3, multiple lamps are utilized within the reaction chamber to ensure that a sufficient number of photons are absorbed.

Light sources within the reactors of FIGS. 1–3 comprise at least one ultraviolet lamp capable of emitting light within the wavelength range of 175 to 500 nanometers (nm). In the illustrated embodiments, the light source is preferably one or more General Electric F40/BL lamps, which are 40 watt bulbs emitting radiation having a wavelength of approximately 360 nm, or Philips PLS 9W/10 lamps or Sylvania FC8T9/350/BL/RS lamps. Any other lamps or bulbs emitting light capable of being absorbed by the catalyst can be used for this purpose, as well, including both medium and high pressure mercury vapor lamps and fluorescent lamps.

The semiconductor catalyst of the present invention can be any of a variety of suitable semiconductor materials, but is preferably an oxide. One particularly advantageous catalyst is titanium dioxide; however, other suitable catalysts, such as $ZnO$, $WO_3$ or their mixtures, can also be used. As noted above, the activity and selectivity of the catalyst can be improved by depositing noble metals (platinum, palladium etc.) onto the catalyst by one of methods described above.

In order that the invention be more clearly understood, the advantages of the matte web carrier of the present invention is further demonstrated by the following examples, which should not be construed to limit the scope of the invention. Each example compares the results achieved in a conventional reactor, with metalized titanium dioxide on the smooth inner wall of a Pyrex glass tube, to the results achieved with a similar metalized titanium dioxide coating on the downstream side of a matte web formed of HEPA-type glass filter material. The conventional photocatalytic reactor is a Pyrex shell (52 millimeter inside diameter by 1200 millimeters length) having a catalytic coating on its inner wall and an axially-directed lamp surrounded by a protective Pyrex liner (45 millimeter outside diameter by 1200 millimeter length). The annular space between the shell and the liner, which is the volume of the reactor, is 590 milliliters. In the case of the HEPA-type matte web, metalized titanium dioxide is deposited on the downstream side of a glass fiber web approximately 0.4 millimeters thick and having a weight of 80 grams per square meter. In either case, the light source was a 40 watt 360 nm lamp (General Electric F40/BL). The reactions were conducted with a host air stream formed of high purity dry air from Wesco (Grade 2.0). All reactions were carried out at a pressure of 770 torr, and the reacted gases were analyzed by gas chromatography after exposure to the catalyst and the light for the indicated periods. The semiconductor catalyst used in the examples was P-25 titanium dioxide obtained from the Degussa Corporation and prepared in a slurry of the type described above in relation to the matte web of FIG. 1, including the metalized ion source described there.

EXAMPLE 1

Table 1 compares the rate of removal of 990 ppm of isooctane from an air stream using the matte web and tubular reactor structures, respectively. The matte web had an area of 1314 square centimeters of metalized titanium dioxide coating on its downstream side, whereas the tubular reactor had an illuminated reactive coating of the same material on smooth glass of 3593 square centimeters. The only other difference was the proportion of deionized water used to form the slurry. The slurry used to coat the matte web support was formed with a five-to-one ratio, while the slurry for the tubular reactor was formed with a nine-to-one ratio. As seen from the data, the rate of removal of isooctane using the matte web is substantially improved over that obtained on the glass tube, despite the matte web having approximately one-third the surface area of the glass tube.

TABLE 1

| Reaction Time | % Removal | |
| --- | --- | --- |
| | HF | G |
| 0 | 0 | 0 |
| 43 | 33 | 32.5 |
| 64 | 52 | 43.5 |
| 98 | 89 | 50 |
| 115 | 100 | |

EXAMPLE 2

Table 2 compares the rate of removal of 200 ppm of carbon monoxide from an air stream using a matte web support, to the rate of removal of the same material on the surface of the glass tube reactor. In this example, the illuminated area of the metalized catalyst on the matte web was 1305 square centimeters in area, whereas the corresponding portion of the glass tube was 1842 square centimeters. Both slurries were formed with a five-to-one ratio of deionized water to catalyst. The results, tabulated in Table 2, show substantially the same percentage of degradation of carbon monoxide despite the fact that the reaction area of the glass web is approximately one-third less than that of the glass tube.

TABLE 2

| Reaction Time | % Removal | |
| --- | --- | --- |
| | HF | G |
| 0 | 0 | 0 |
| 33 | 29 | 25 |
| 57 | 49 | 42 |
| 91 | 74 | 72 |
| 128 | 99 | 96 |

EXAMPLE 3

Table 3 presents the rate of removal of acetone from an air stream using the same two reactors, reaction areas and slurry compositions as in Example 1. The rate of removal with the two reactors was almost identical, demonstrating that the matte web reactor is approximately three times as effective per unit area.

TABLE 3

| Reaction Time | % Removal | |
| --- | --- | --- |
| | HF | G |
| 0 | 0 | 0 |
| 10 | | 14 |
| 25 | | 36.5 |
| 33 | | 41 |
| 50 | 50 | 49 |
| 65 | 73 | |
| 98 | 98 | |

EXAMPLE 4

Table 4 presents the results of degradation of 6200 ppm of methanol from an air stream by passing it through a matte web having a metalized catalytic surface area of 660 square centimeters and a glass tube reactor having an illuminated surface area of 1845 square centimeters. The slurries used to form the metalized catalyst coatings on the two supports both had nine parts deionized water for one part catalyst. The results show that the matte web reactor achieves removal of ninety percent of the methanol in about half the time as the coated glass tube. The matte web reactor is therefore far more effective per unit area than the coated glass tube.

TABLE 4

| Reaction Time | % Removal | |
| --- | --- | --- |
| | HF | G |
| 0 | 0 | 0 |
| 17 | 62 | 29 |
| 24 | 76 | 39 |
| 34 | 90 | 60 |
| 46 | 97 | 74 |
| 70 | 100 | 96 |

From the above, it can be seen that the matte web support and corresponding reactor of the present invention are extremely efficient, versatile and adaptable to a variety of different degradation processes. In addition, the matte web material itself is ideal for mechanically filtering relatively large particles from a fluid stream, leaving the catalyst to degrade the remaining chemical and biological contaminants without interference by large non-reactive components.

The appended claims are not limited to the embodiments described herein, but rather are intended to cover all variations and adaptations falling within the true scope and spirit of the present invention.

What is being claimed is:

1. A reactor for use in the photopromoted catalyzed degradation of compounds in a fluid stream, comprising:
   a conduit for directing said fluid stream, said conduit defining a reaction chamber;
   a self-supporting sheet of fibrous matte web material within said reaction chamber and having first and second sides, said matte web material comprising a plurality of densely-packed fibers permitting said fluid stream to pass from said first side to said second side;
   a semiconductor catalyst affixed to at least one side of said matte web material for contact by said fluid stream; and
   a light source disposed to illuminate at least a portion of said catalyst in contact with said fluid stream.

2. The reactor of claim 1 wherein:
   said fluid stream passes through the matte web material from said first side to said second side;
   said semiconductor catalyst is disposed on said second side; and
   said light source illuminates at least said second side.

3. The reactor of claim 2 wherein:
   said semiconductor catalyst is disposed on both said first and second sides of the matte web material; and
   said light source illuminates both said first and second sides.

4. The reactor of claim 2 wherein:
   said semiconductor catalyst is distributed substantially throughout the matte web material.

5. The reactor of claim 1 wherein:
   said semiconductor catalyst is an oxide of a transition metal.

6. The reactor of claim 1 wherein:
   said semiconductor catalyst is titanium dioxide.

7. The reactor of claim 1 which further comprises:
   a noble metal deposited on said semiconductor catalyst.

8. The reactor of claim 1 wherein:
   said matte web material is pleated.

9. The reactor of claim 1 wherein:
   said matte web material comprises glass fibers.

10. The reactor of claim 1 wherein:
    said matte web material comprises cellulose fibers.

11. A reactor for use in the photopromoted catalyzed degradation of compounds in a fluid stream comprising:
    a conduit for directing said fluid stream, said conduit defining a reaction chamber;
    a self-supporting, pleated sheet of fibrous matte web material arranged in a substantially cylindrical configuration within said reaction chamber and having inner and outer sides, said matte web material comprising a plurality of densely-packed fibers permitting said fluid stream to pass from said outer side to said inner side;
    a semiconductor catalyst affixed to at least the inner side of said matte web material for contact by said fluid stream; and
    a light source disposed to illuminate at least a portion of said inner side as said catalyst contacts said fluid stream.

12. A reactor for use in the photopromoted catalyzed degradation compounds in a fluid stream, comprising:
    a conduit for directing said fluid stream, said conduit defining a reaction chamber;
    a plurality of sheets of pleated fibrous matte web material arranged in a substantially parallel configuration within said reaction chamber and having first and second sides, each of said sheets of matte web material comprising a densely-packed plurality of fibers defining a filter medium to permit said fluid stream to pass substantially transversely between said first and second sides, and further such that said web material defines a filter to capture particles in said fluid stream larger than approximately 0.3 microns;
    a semiconductor catalyst affixed to at least one side of each of said sheets of matte web material for contact by said fluid stream; and
    a light source disposed to illuminate at least a portion of said catalyst in contact with said fluid stream.

13. A reactor for use in the photopromoted catalyzed degradation of compounds in a fluid stream, comprising:
    a conduit for directing said fluid stream, said conduit defining a reaction chamber;
    a self-supporting sheet of fibrous matte web material within said reaction chamber and having first and second sides, said matte web material comprising a plurality of densely-packed fibers defining filter media to permit said fluid stream to pass from said first side to said second side and such that said web material defines a mechanical filter to capture large particle in said fluid stream;
    a semiconductor catalyst affixed to at least said second side of said matte web material for contact by said stream; and
    a light source disposed to illuminate at least a portion of said catalyst in contact with said fluid stream.

14. The reactor of claim 13 wherein:
    said fluid stream passes through the matte web material from said first side to said second side;
    said semiconductor catalyst is disposed on said second side; and
    said light source illuminates at least said second side.

15. The reactor of claim 14 wherein:
    said semiconductor catalyst is disposed on both said first and second sides of the matte web material; and
    said light source illuminates both said first and second sides.

16. The reactor of claim 14 wherein:
    said semiconductor catalyst is distributed substantially throughout the matte web material.

17. The reactor of claim 13 wherein:
    said semiconductor catalyst is an oxide of a transition metal.

18. The reactor of claim 13 wherein:
    said semiconductor catalyst is titanium dioxide.

19. The reactor of claim 13 which further comprises:
    a noble metal deposited on said semiconductor catalyst.

20. The reactor of claim 13 wherein:
    said matte web material is pleated.

* * * * *